_United States Patent_ [19]

Clarke

[11] 3,846,909

[45] Nov. 12, 1974

[54] COMBINATION OF A KNIFE AND SHARPENER

[76] Inventor: Robert E. Clarke, 1410 Saratoga Dr., Bel Air, Md. 21014

[22] Filed: Oct. 29, 1973

[21] Appl. No.: 410,751

[52] U.S. Cl. .................................................. 30/138
[51] Int. Cl. .......................... B24b 3/54, B26b 11/00
[58] Field of Search ................. 30/138, 139; 51/214

[56] References Cited
UNITED STATES PATENTS

| | | |
|---|---|---|
| 2,291,128 | 7/1942 | Yarrow ................................ 30/138 |
| 2,337,158 | 12/1943 | Frank ................................... 30/138 |
| 2,700,819 | 2/1955 | Mason .................................. 30/138 |
| 2,744,320 | 5/1956 | Palermo ............................... 30/138 |

Primary Examiner—Al Lawrence Smith
Assistant Examiner—J. C. Peters
Attorney, Agent, or Firm—J. Wesley Everett

[57] ABSTRACT

The invention relates to an improvement in a combination knife and a sharpener therefor carried by a detachable portion of the handle which may be detached from the portion of the handle affixed to the knife blade to be operated along the edge of the knife blade.

7 Claims, 8 Drawing Figures

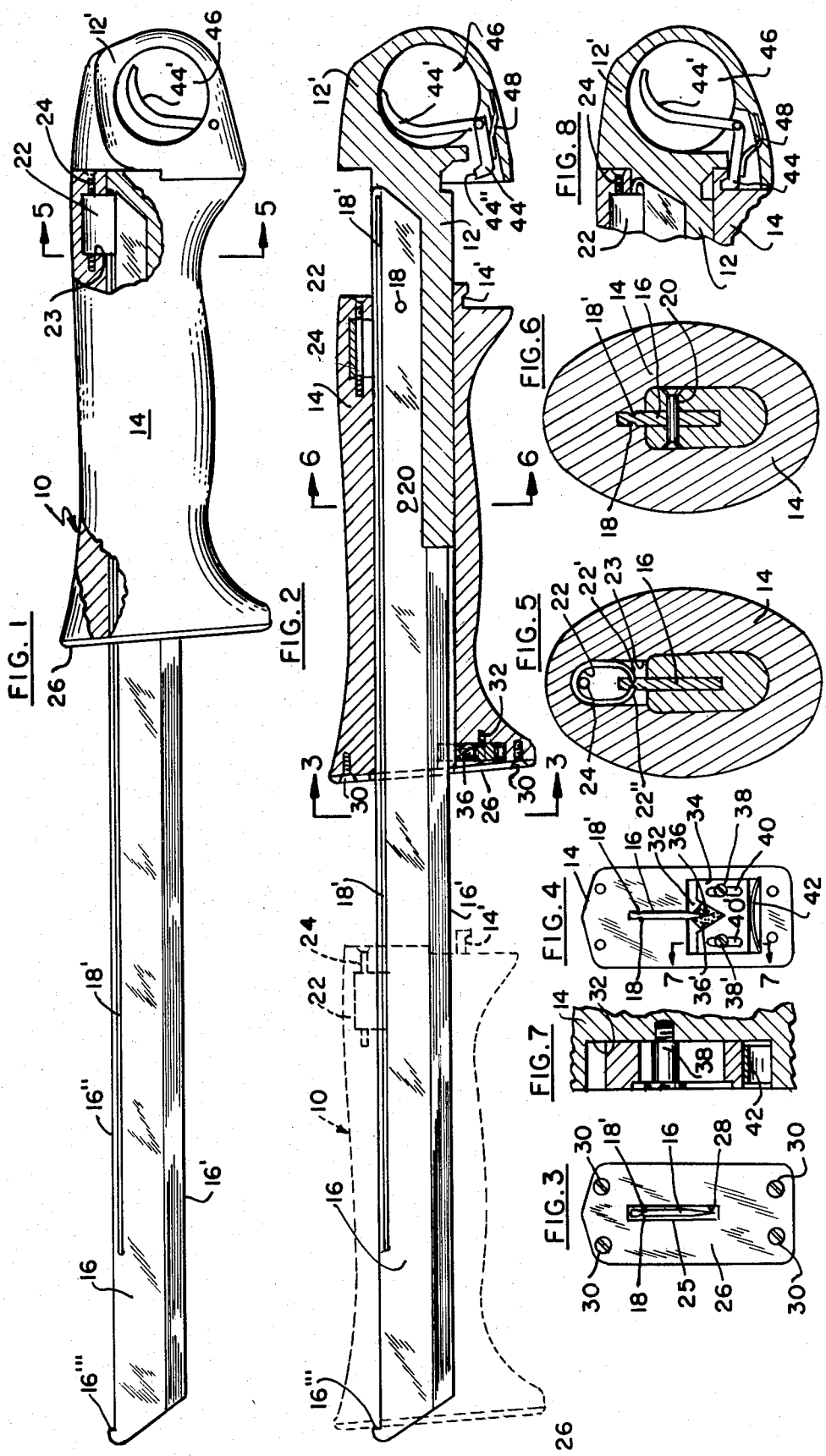

COMBINATION OF A KNIFE AND SHARPENER

The present invention relates to a combination knife and sharpener for the knife blade.

One object of the invention is to provide a sharpener that will always be in contact with the cutting edge of the blade when the knife is being sharpened.

Another object is to provide means that will keep the sharpening elements in proper position when sharpening the blade.

A further object of the invention is to provide an easily interchangeable sharpening element.

A still further object of the invention is to provide a sharpening element that is resiliently held in contact with the knife edge.

While several objects of the invention have been pointed out, other objects, uses and advantages will become apparent as the nature of the invention is more fully set forth in the following detail description with reference to the accompanying drawings, in which:

FIG. 1 is a horizontal view in elevation having certain parts broken away to show certain internal structures in the handle section.

FIG. 2 is a horizontal sectional view of the handle showing the manner in which the handle is attached to the knife blade.

FIG. 3 is a sectional view taken along line 3—3 of FIG. 2 showing the front cover plate.

FIG. 4 is a sectional view taken along line 3—3 of FIG. 2 with the cover plate removed.

FIG. 5 is a sectional view taken along line 5—5 of FIG. 1.

FIG. 6 is a sectional view taken along line 6—6 of FIG. 2.

FIG. 7 is a sectional view taken along line 7—7 of FIG. 4.

FIG. 8 is a fragmentary sectional view of the rear section of the handle showing the locking means for the detachable section of the handle carrying the sharpening means.

Referring in particular to the detail construction of the knife and its sharpening means, 10 represents the knife as a complete unit. The handle is formed of two members, an inner member 12 and an outer member 14. The inner member is fixed to the blade 16 by the rivets 18 and 20. The outer handle member is adapted to telescope the inner handle as shown best in FIG. 2. The blade 16 is provided with a cutting edge 16' and a back edge 16". The outer handle member 14 is provided with an open spring-like clamp 22 having its open edges 22' and 22" adapted to engage the grooves 18 and 18' extending along the blade adjacent its back edge 16". The clamp member 22 is fitted into a recess 23 within the outer housing and is held in place by a suitable screw 24. The opposite end of the outer handle is provided with a plate 26 having a slot 25 through which the blade 16 extends. The plate is held to the outer handle member by suitable screws 30.

In the rear of the plate 26 is a recess 32 into which is placed a sharpening unit 34. The sharpening unit supports one or more sharpening elements 36 and 36' adapted to contact the cutting edge 16' of the blade 16. The unit is supported upon the outer handle member by suitable screws 38 and 38' which operate within the slots 40 and 40'. Positioned beneath the sharpening unit is a compression spring 42 which is adapted to urge the sharpening unit upwardly into contact with the cutting edge 16' of the knife blade. The shoulder screws 38 and 38' are of the type to allow movement of the unit when tightly secured to the handle housing.

Normally the outer handle member 14 is held fully telescoped over the inner handle member 12 by a spring-loaded latch 44. The latch is provided with a lever portion 44' adapted to be operated within an opening 46 located in the outer end portion 12' of the inner handle member 12. The lever end 44' is adapted to engage a notch 14' in the outer handle member for normally holding the two handle members in assembled relationship. The latch is normally held within the notch 14' by the spring 48.

In operation, beginning with the handle members as shown in FIG. 1, the latch lever 44' is lifted releasing the latch from the notch 14'. The outer handle member is moved forward until the plate 26 contacts the notch 16''' and moved back to the position shown in FIG. 1. When the upper handle is moved as just described the sharpening means are in contact with the cutting edge 16' of the blade thereby sharpening the blade. The outer handle member may be moved as many times along the blade as is necessary to sharpen the cutting edge. When the operation is completed the outer handle is moved to the position as shown in FIG. 1 and is locked in this position by the latch 44, wherein the knife is ready for use.

While one operating form of the invention has been shown and described, it is not intended as a limitation as the scope of the invention is best defined in the appended claims.

I claim:

1. The combination of a knife, including a handle means and a cutting blade, and a sharpener for the cutting edge of the blade, comprising:
   a. said handle means having an inner handle member having means for attaching the inner handle member to one end of the blade wherein the knife blade is adapted to extend outwardly from one end of the inner handle member;
   b. an outer handle member adapted to be slidably receivable over at least a substantial portion of the inner handle member and slidably removable therefrom over the end of the inner handle member from which the blade extends, and slidable along the knife blade;
   c. means carried by the handle members for releasably securing the outer handle member in telescoped position over the inner handle member;
   d. means for supporting the sharpening means on the outer handle member on its end adjacent the extended blade, and means for resiliently urging the sharpening means toward the blade and in contact with the cutting edge thereof when the outer handle member is released from the inner handle and moved along said blade.

2. The combination of a knife and sharpener therefor as claimed in claim 1 wherein the inner handle member is provided with a stop portion adjacent its end opposite the extended blade for limiting the telescoping movement of the outer handle member over the inner handle member, the stop portion of the inner handle member having means for supporting a lever for operating a latch for releasably holding the two handle members in telescoped position.

3. The combination of a knife and sharpener therefor as claimed in claim 1 wherein a guide means is provided adjacent the edge of the blade opposite the cutting edge, a guide follower carried in the outer handle member adapted to slidably engage the guiding means when the outer handle member is moved along the knife blade.

4. The combination of a knife and sharpener therefor as claimed in claim 3 wherein the guide following means is positioned adjacent the end of the outer handle member opposite the said end carrying the sharpener.

5. The combination of a knife and sharpener therefor as claimed in claim 3 wherein the guide follower is in the form of an open end spring clamp the open end of which is adapted to engage the guiding means extending along the knife blade.

6. The combination of a knife and sharpener therefor as claimed in claim 1 wherein the resilient means for urging the sharpening means toward and in contact with the cutting edge of the knife blade is in the form of an independent unit, said outer handle member having on its end adjacent the blade a recess for receiving the said sharpening unit, and means for supporting said unit within the said recess.

7. The combination of a knife and sharpener therefor as claimed in claim 1 wherein the sharpening unit is shielded by a removable cover extending over the end of the outer handle member adjacent the knife blade.

* * * * *